United States Patent [19]
Schmitt et al.

[11] Patent Number: 5,466,055
[45] Date of Patent: Nov. 14, 1995

[54] ELECTROHYDRAULIC UNIT FOR REGULATING THE PRESSURE IN VEHICLE BRAKING SYSTEMS

[75] Inventors: Edgar Schmitt, Vaihingen/Enz; Heinz Siegel, Stuttgart; Robert Mergenthaler, Markgröningen; Helmut Deringer, Erligheim, all of Germany

[73] Assignee: Robert Bosch GmbH, Stuttgart, Germany

[21] Appl. No.: 133,069

[22] PCT Filed: Sep. 3, 1992

[86] PCT No.: PCT/DE92/00738

§ 371 Date: Oct. 12, 1993

§ 102(e) Date: Oct. 12, 1993

[87] PCT Pub. No.: WO93/08050

PCT Pub. Date: Apr. 29, 1993

[30] Foreign Application Priority Data

Oct. 12, 1991 [DE] Germany .................. 41 33 879.0

[51] Int. Cl.[6] .................................................. B60T 8/36
[52] U.S. Cl. ................. 303/119.2; 137/884; 303/113.1; 303/116.4; 439/34
[58] Field of Search ............... 303/113.1, 116.4, 303/119.2; 137/884; 439/34, 299

[56] References Cited

U.S. PATENT DOCUMENTS

| | | | |
|---|---|---|---|
| 4,813,448 | 3/1989 | Leiber | 303/113.1 |
| 4,842,525 | 6/1989 | Galloway et al. | 303/119.2 |
| 5,137,455 | 8/1992 | Moerbe et al. | 439/34 |
| 5,141,298 | 8/1992 | Von Hayn et al. | 303/119.2 |
| 5,288,141 | 2/1994 | Isshiki et al. | 303/113.7 |

FOREIGN PATENT DOCUMENTS 373551 12/1989 European Pat. Off. .
3701019 7/1988 Germany .

*Primary Examiner*—Matthew C. Graham
*Attorney, Agent, or Firm*—Edwin E. Greigg; Ronald E. Greigg

[57] ABSTRACT

An electrohydraulic unit having a hydraulic block with integrated valves, chambers, pumps and conduits, and electromagnets for the valves that are held on the hydraulic block. An electric motor for the pumps and relays for controlling the electromagnets and the electric motor. Electromagnets and relays are covered by a cover with connecting connectors for making an electrical contact. To make the design simple to manufacture and assemble, the cover is subdivided into a connector base and a covering hood that can be attached thereto. The connector base overlaps the electromagnets and the covering hood overlaps the relays, which are inserted into two connector receptacles disposed on the connector base and secured against axial displacement by the covering hood. The electrical connection of the electromagnets to the connectors and relays is effected via a flexible contact foil and a stamped screen embedded in the connector base.

26 Claims, 7 Drawing Sheets

ELECTROHYDRAULIC UNIT FOR REGULATING THE PRESSURE IN VEHICLE BRAKING SYSTEMS

The invention is based on an electrohydraulic unit for regulating the pressure in vehicle braking systems, also called a hydro unit.

BACKGROUND OF THE INVENTION

In a known electrohydraulic unit of this type (European Patent EP 0 373 551 A2), the cap- or hood-shaped lid for covering the electromagnets and relays supports along its one side surface a first, longitudinally extending connector group with a plurality of embedded connectors that is accessible from the outside. On the side remote from this connector group, the hood-shaped lid projects from the hydraulic block, and is equipped here in the projecting region with second, longitudinally extending connector group that is secured to its inside wall. A third connector group secured laterally to the hydraulic block is associated with the second connector group in the projecting region of the lid, and is equipped with the connectors that complement the connectors of the second connector group. When the hood-shaped lid is placed on the hydraulic block, each of the connectors of the second connector group engages a connector of the third connector group. The latter connectors are securely wired to the electromagnets of the fluid valves, and to the relays that are disposed in a part of the third connector group that has no connectors, and are secured individually.

The hood-shaped lid is placed on the hydraulic block and sealed against the block by means of an annular seal. A discharge conduit in the lid or in the hydraulic block ensures that, with leaky fluid valves, no fluid, i.e., brake fluid, can collect inside the hood-shaped lid. On its side remote from the projecting region, the lid has a pair of hinged shoulders that engage respectively each pin protruding from the hydraulic block. For opening and closing, the lid is pivoted around this pivoting axis formed by means of each pin. When the lid closes, the connectors of the second connector group on the underside of the lid automatically come into contact with the complementary connectors of the third connector group, thus producing the electrical connection of the electromagnetic valves and relays to the engine and the connectors of the first connector group.

In a valve block for a hydraulic braking system that is also known (German Patent DE 37 01 019 A1), the electromagnetic valves hinged to the valve block and protruding with their electrical part are covered by a cover that is pivotably held on the valve block. The cover supports a longitudinally extending connector group with a plurality of connectors (blade-contact connector). The electrical connection of the electromagnetic valves to the connectors is effected by means of a flexible connecting foil soldered to both the electrical connections of the electromagnetic valves and the ends of the connectors embedded in reinforcement ribs. In this case, the connection foil is dimensioned such that its position permits a tilting of the cover by 90° to 180° around the edge adjacent to the connector group. This simplifies the soldering process significantly.

OBJECT AND SUMMARY OF THE INVENTION

The electrohydraulic unit of the invention has the advantage of a design that is economical to manufacture and extremely simple to assemble, thus helping to save assembly time. By means of the separation of the connector base and hood, both can be manufactured in relatively simple manufacturing operations, wherein the connector base, including the connector, connector connections and relay-connector contacts, are completely prefabricated. For assembly, the connector base is placed in the upwardly-pivoted state against the hydraulic block. Then the contact foil, previously connected to the electrical connections of the magnet valves, is soldered to connector connections in the hollow space region of the cover cap and, at a pivoting angle of approximately 120°, the contact foil rests cleanly against the connector connections and can be easily soldered thereon. The connector base is subsequently joined flush and tightly onto the hydraulic block by means of pivoting. In the process, the flexible contact foil unrolls onto the inside wall of the hollow space and is forced into a defined relative position in which the occurrence of chafe marks from the unavoidable vibration of the unit in the installed state is assuredly prevented. The connector base is fixed to the hydraulic block by means of a central bushing, through which a stay bolt is guided and screwed into the hydraulic block. For this purpose, one of the stay bolts screwed into the hydraulic block is preferably used for suspending the electrohydraulic unit in the vehicle.

The two relays for controlling the magnet valves and the electric motor are disposed in a space-saving manner beneath the connector group embodied as a frame connector. Their assembly is effected by means of a simple insertion into the connector receptacles of the connector base; the electrical contact occurs at the same time. Aside from its protective and covering functions for the relays, the covering hood, placed sealingly on the connector base, beneath the frame connector, assures a dependable hold of the relays in the connector receptacles, thus preventing contact-related damage and subsequently vibrations of the relays in the connector receptacles that would cause them to fall out. By means of a central fastening screw screwed into the connector base for securing the covering hood to the connector base, the latter can be easily removed and the relays can be easily disassembled, which is aided to a great extent by recesses provided laterally on the outside, to the right and left in the connector base, and through which the relays can be grasped from behind. The arrangement of the relays to the right and left of the center of the electrohydraulic unit, in which the one stay bolt for suspending the unit is also located, is also space-saving, so that a compact structural unit results that has a relatively small total size and has no projecting parts.

Advantageous refinements and improvements of the electrohydraulic unit disclosed are possible by means of the provisions outlined hereinafter.

In accordance with a preferred embodiment of the invention, the contact of the flexible contact foil for an electrical connection of the magnet valves to the magnet valve relay and the connectors, as well as the electrical connection of the electric motor to the electric motor relay and the connectors, and the electrical connection to the connector bushings in the connector receptacles of the relays is effected by a stamped screen that can be manufactured in accordance with simple manufacturing techniques and is also extruded during the production of the plastic connector base, and thus embedded securely in the connector base. The ground connection is effected by means of a grounding screw screwed into the hydraulic block, to which the stamped screen is screwed via a loop.

In accordance with an advantageous embodiment of the invention, slits are disposed the flexible contact foil provided with tracks and soldering points at the ends of the tracks, in the region of the track ends; these slits keep a certain distance from the tracks and terminate in perforations in the contact foil. Because of this, different tolerance positions of the connections of the electromagnets for the magnet valves that occur due to different heights of positions of the soldering pins on the electromagnets after an installation that results in variations can be compensated. The perforations at the slit ends prevent further tearing of the slits in the foil.

In a useful embodiment of the invention, the contact foil has a centrally disposed, longitudinally extending slit, through which a pigtail for the electric motor is guided that is soldered or crimped onto a terminal tag protruding from the stamped screen into the hollow space at one end, and at the other end to a contact bushing for connection with the electric motor. The contact bushing is preferably held on a plastic intermediate connector, namely at the end of a tube embodied in one piece with the intermediate connector and inserted through a bore in the hydraulic block to the side supporting the electric motor, and that acts as the guide for the pigtail. The intermediate connector is wedged in the bore by means of a pine-tree profile embodied at the circumference of the tube after the tube has been pushed into the bore, so that it is unnecessary to additionally hold the intermediate connector down by other means.

All of the measures described above serve in the overall economical manufacture and assembly of the electrohydraulic unit.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
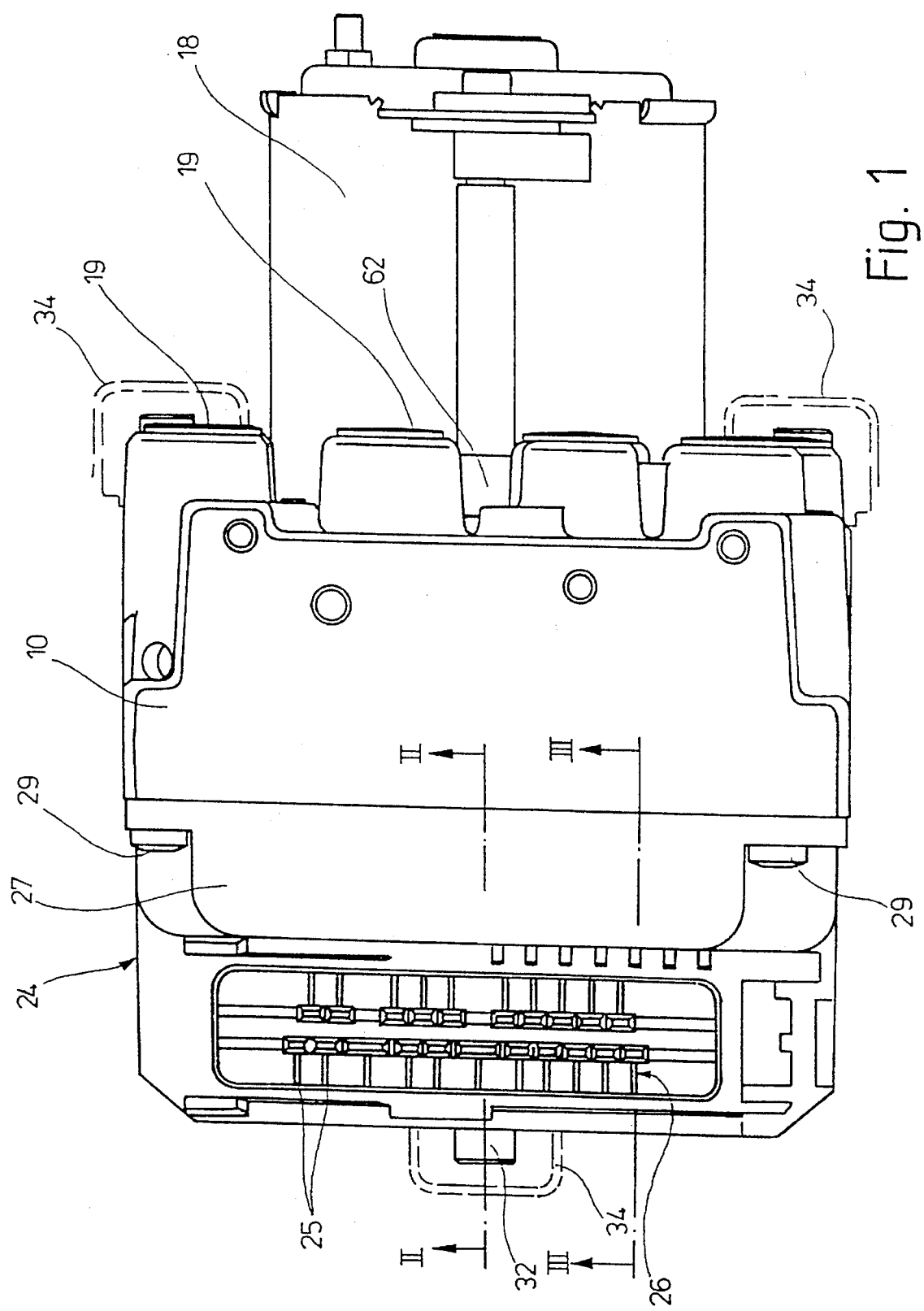
FIG. 1 is a top view of an electrohydraulic unit.
Figure 2:
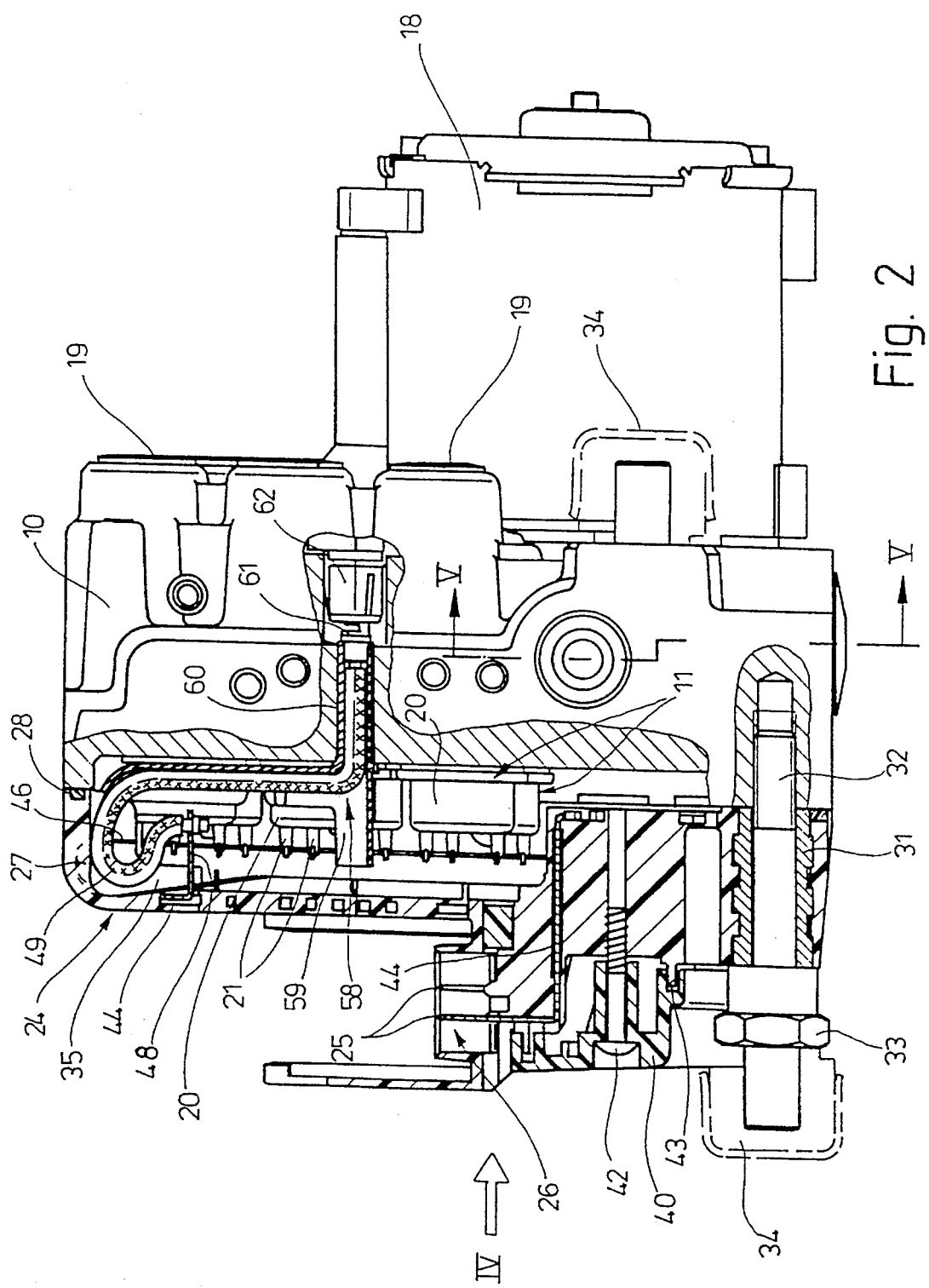
FIG. 2 is a side view of the unit in FIG. 1, partly in section along line II—II.
Figure 3:
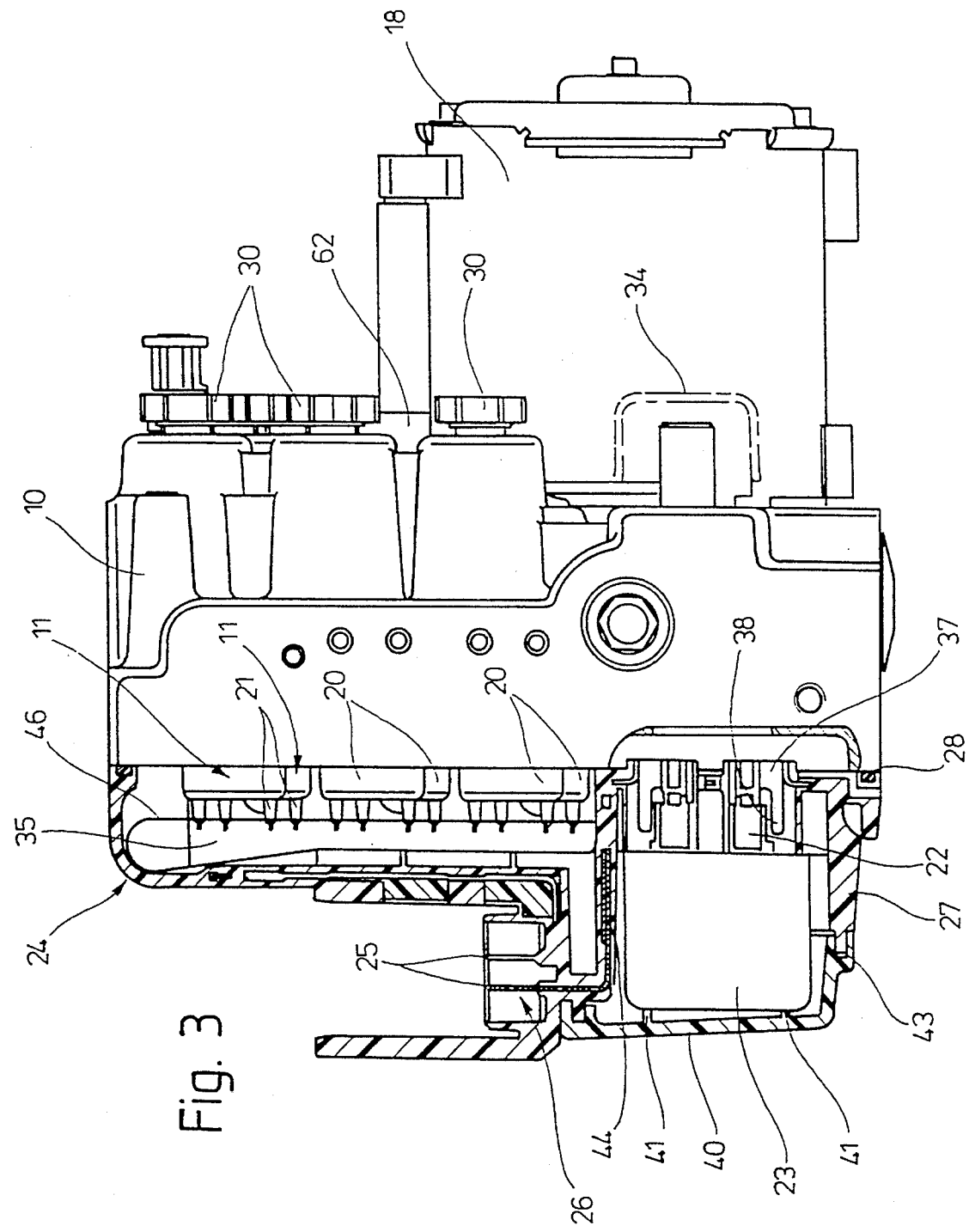
FIG. 3 is a side view of the unit in FIG. 1, partly in section along line III—III and with the protective caps that cover the hydraulic connections.

The electrohydraulic unit for regulating the pressure in vehicle braking systems shown in different views in FIGS. 1 through 5 has a hydraulic block 10 with electromagnetic valves 11 secured therein whose electromagnets are indicated by 20, fluid chambers (FIG. 5), such as damping chambers 12 and storage chambers 13, two fluid pumps 14, 15 and the fluid conduits 16, which connect the electromagnetic valves, the fluid chambers and the fluid pumps to each other and to hydraulic connections 19 of the group. As can be seen from FIG. 5, the fluid pumps 14, 15 are driven by an eccentric 17 for a lifting motion. The eccentric 17 is seated on the gear power take-off shaft of an electric motor 18. As can be seen in FIGS. 1 and 2, the electric motor 18 is mounted on and secured to that side of the hydraulic block 10 on which the hydraulic connections 19 are also located. In FIG. 3 the hydraulic connections 19 are covered with protective caps 30, which are screwed into the hydraulic connections 19. The electromagnets 20 of the electromagnetic valves 11, hereinafter referred to as magnet valves 11, protrude from the opposite side of the hydraulic block 10; their electrical connections are indicated by 21. The electromagnets 20 are protected, along with the relays 23 for controlling the magnet valves 11 and the electric motor 18, and likewise disposed on this side of the hydraulic block 10 and to be described below, by means of a cover indicated in its entirety by 24, to which a number of connectors 25 are connected into a striplike connector group 26. A detachable electrical connection of the unit to the vehicle's cable harness is produced via this frame connector, by means of a blade terminal, for example.

Figure 4:
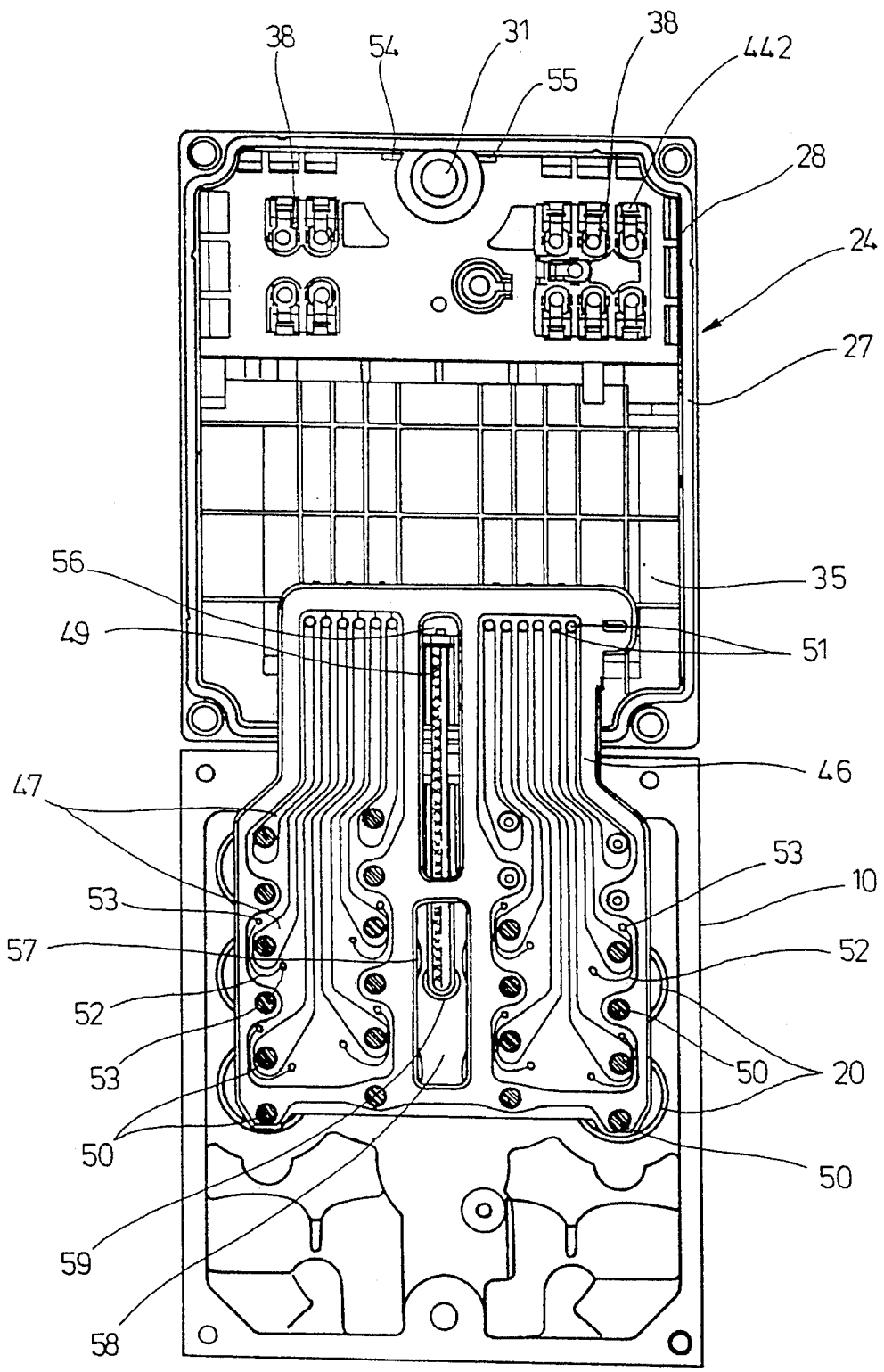
FIG. 4 is a view of the unit in the direction of arrow IV in FIG. 2, the connector base being pivoted upwardly.
Figure 5:
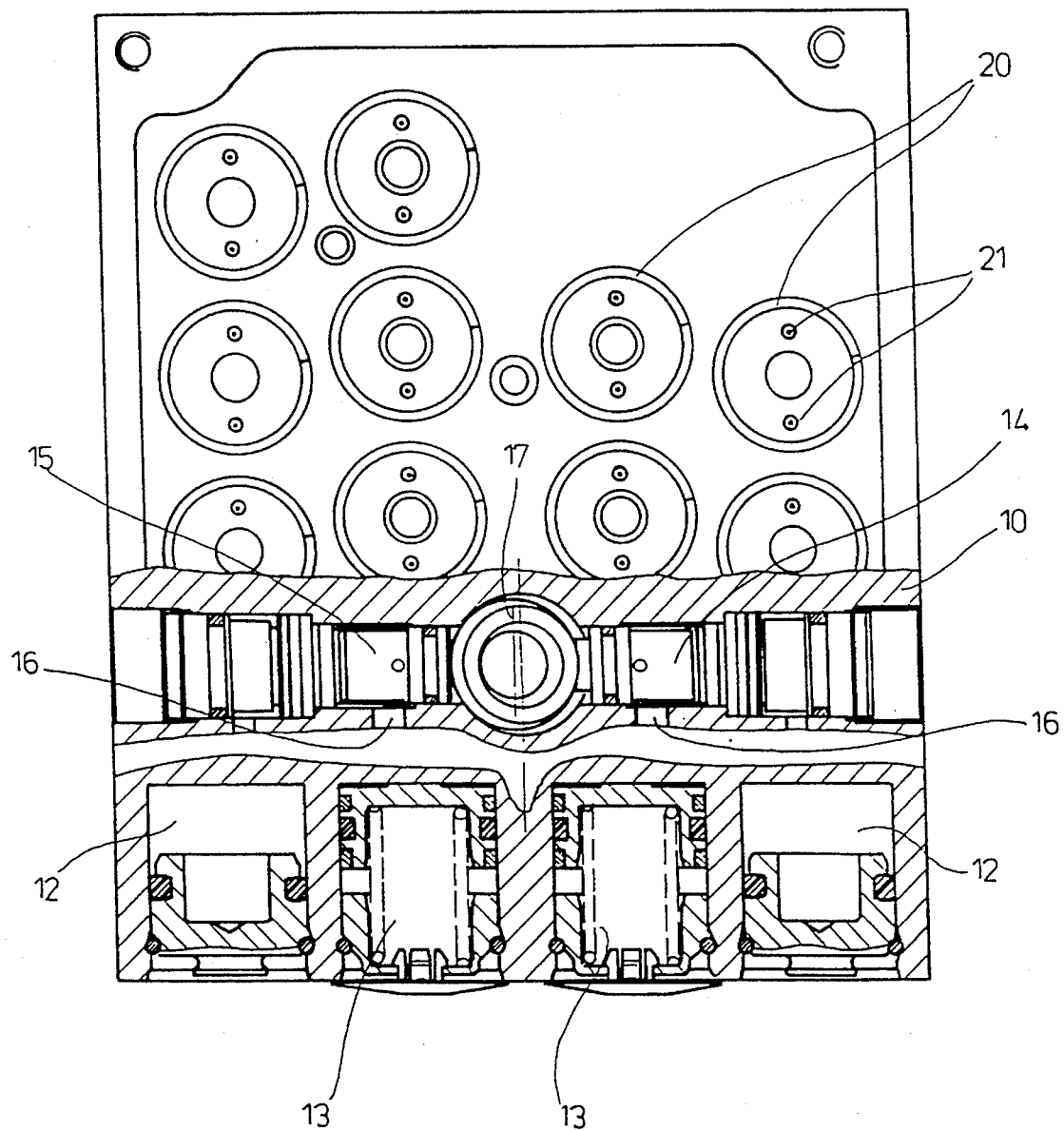
FIG. 5 is a section along line V—V in FIG. 2.
Figure 6:
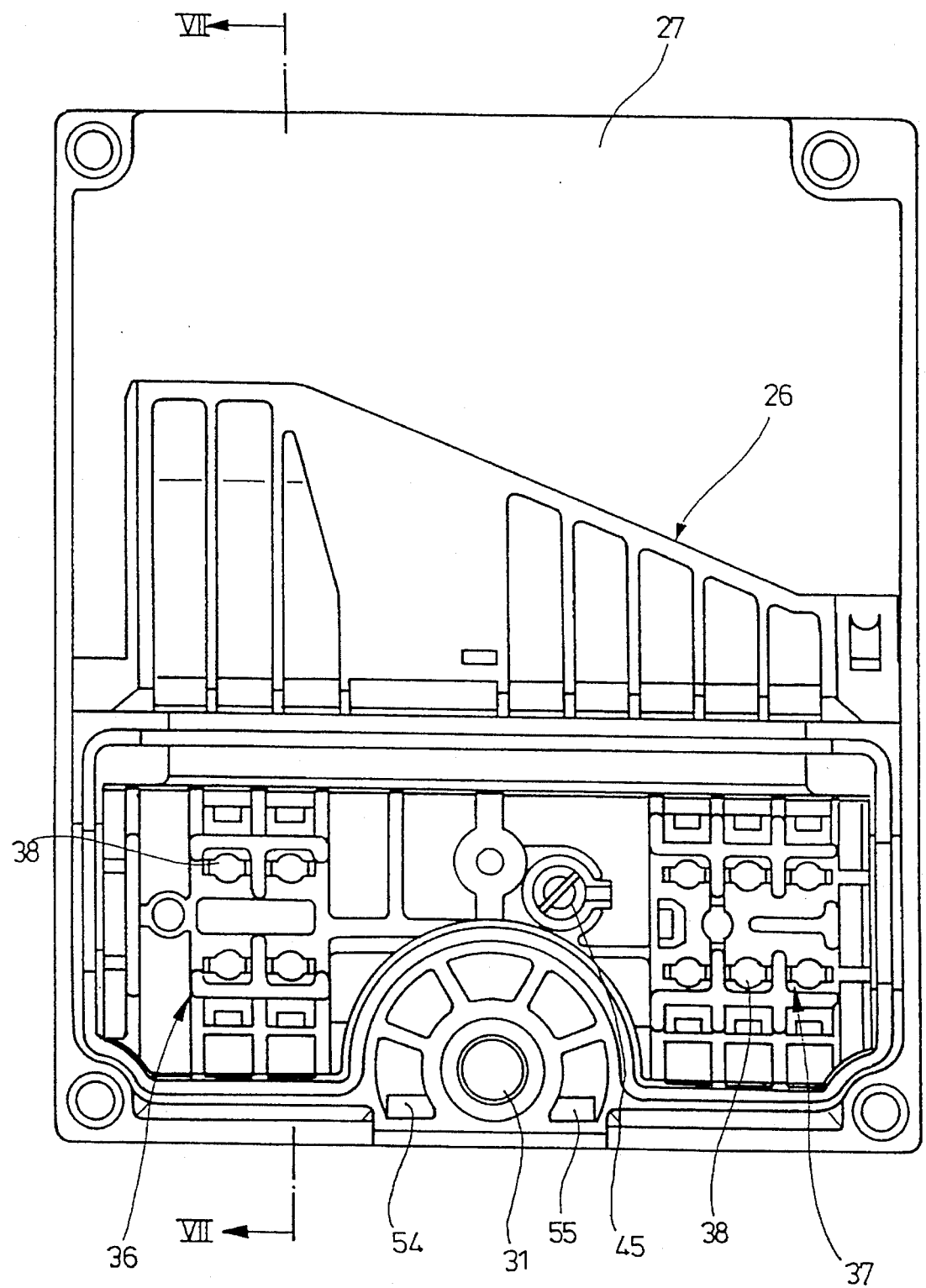
FIG. 6 is a top view of the connector base to be secured to the unit.
Figure 7:
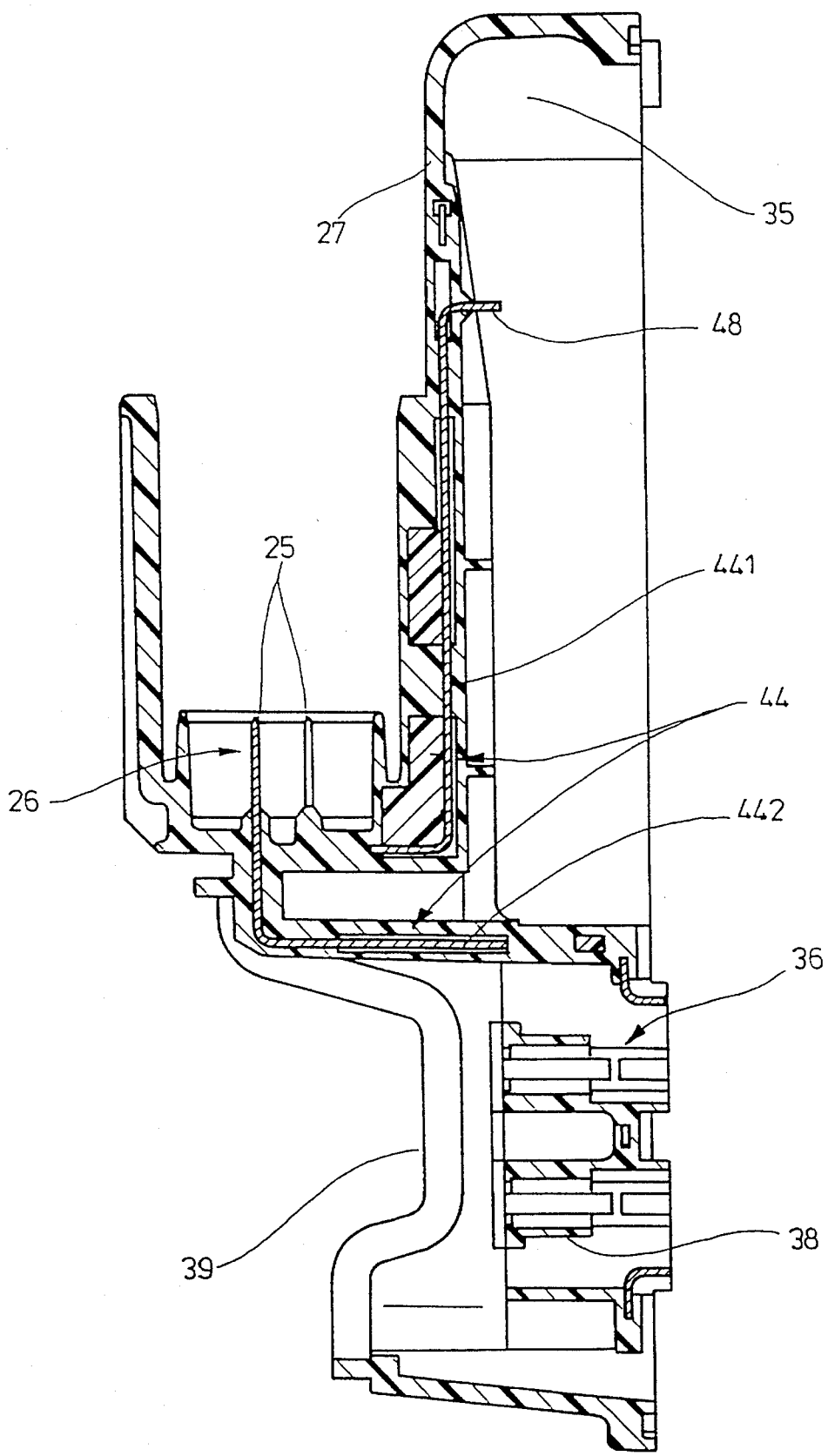
FIG. 7 is a section along line VII—VII in FIG. 6.

The cover 24 is divided in two and comprises a plastic connector base 27 and a covering hood 40 that can be placed onto the connector base 27, and is likewise made of plastic. The connector base 27 is seated flush on the hydraulic block 10, and is sealed with respect to the hydraulic block 10 by means of a circumferential sealing ring 28 (FIG. 4). The sealing ring 28 in this case has a contour that is adapted to the contour of the connector base 27. The connector base 27 is secured to the hydraulic block 10 by means of four threaded screws 29 (FIG. 1). The threaded screws 29 are inserted through the connector base 27 through corresponding bore holes at the four corners of the connector base 27, and are screwed into the hydraulic block 10. A stay bolt 32 that can be screwed into the hydraulic block 10 in the center of the unit serves to secure the connector base 27 and, along with further stay bolts, additionally serves to suspend the unit in the vehicle. In the process, the stay bolt 32 is inserted through a spacing bushing 31 held in the connector base 27, and screwed into the hydraulic block 10 by means of a molded hexagon nut 33. A rubber shock absorber 34 that serves along with further rubber shock absorbers 34 to suspend the unit is placed on the protruding end of the stay bolt 32. In the region of the electromagnets 20, the connector base 27 has a hollow space 35 that is embodied such that the connector base 27 overlaps the electrical connections 21 of the electromagnets 20 at a distance. Two connector receptacles 36, 37 (FIGS. 3 and 6) for the two relays 23 are embodied beneath the hollow space 35, symmetrically to the axis, to the left and right of the stay bolt 32; of these, only the relay 23 for controlling the magnet valve is shown in FIG. 3. The connector receptacles 36, 37 for the motor and magnet valve relays 23 are provided with a plurality of connector bushings 38, into which the connections of the relays 23, embodied in the form of contact pins 22, are inserted. As will be described below, the connector bushings 38 are connected to the connectors 25 and the electromagnets 20 or the electric motor 18. Because of this embodiment of the connector receptacles 36, 37, when the relays 23 are inserted in simple fashion, the mechanical fastening and electrical contact are simultaneously produced. As follows from FIG. 7, the connector base 27 is provided in the region of each connector receptacle 36, 37 with recesses 39, of which only the recess 39 associated with the connector receptacles 36 is seen in FIG. 7. These recesses 39 serve to make the disassembly of the two relays 23 less difficult: the relays can be grasped better through the recesses 39 and pulled out of the connector receptacles 36, 37. The covering hood 40 to be placed beneath the frame connector 26 on the connector base 27 is embodied such that it completely encloses the two relays 23 and rests against the face end of the relays 23 with a rib 41 disposed on the bottom of the hood (FIG. 3). Because of this, vibrations of the unit in the vehicle cannot lead to loosening of the relays 23 in the connector receptacles 36, 37, and to damage of the contact. The covering hood 40 is screwed onto the connector base 27 by means of a central fastening screw 42 (FIG. 2). A labyrinth 43 that can be supplemented by a further sealing ring if needed serves as a dust- and moisture-proof covering of the relays 23.

The connector 25 of the frame connector 26, with its connector connections, the connector bushings 38 in the connector receptacles 36, 37 and electrical connecting lines among them and to the electromagnets 20 and the electric motor 18, can be realized by means of a stamped screen 44 completely embedded in the connector base 27, which is extruded from plastic. As can be most clearly recognized in FIG. 7, the stamped screen 44 is subdivided into two partial screens 441, 442, which are produced separately and attached to one another in the connector base 27 prior to extrusion. The first partial screen 441 in this case is integrated into the region of the connector base that overlaps the hollow space 35, and the second partial screen 442 is integrated into the region of the connector base overlapped by the covering hood 40. A part of the connector 25 is embodied on both partial screens 441, 442. On the ground side, the stamped screen 44 is secured to the hydraulic block 10, for which purpose the lower partial screen 442 is connected to a ground screw 45 screwed into the hydraulic block 10 via a loop not seen here.

The electrical connection to the electromagnets of the magnet valves 11 and to the electric motor 18 is produced in the upper partial screen 442. The first-described connection is effected via a flexible contact foil 46 with a plurality of strip conductors 47 (FIG. 4), and the latter by means of a terminal tag 48 with pigtail 49 protruding from the partial screen 441 into the hollow space 35. Soldering points 50, 51 are provided at both ends of the strip conductors 47 on the contact foil 46. The electrical connections 21 of the electromagnets 20 are soldered at the soldering points 50, while the soldering points 51 produce the connections of the strip conductors 47 to the electrical connecting ribs in the stamped screen 44. For the purpose of compensating for different tolerance positions of the electrical connections 21 of the electromagnets 20, cuts 52 are made into the contact foil 46 around the ends of the strip conductors supporting the soldering points 50, and which terminate at each end in a perforation 53. The ends of the strip conductors can be lifted slightly out of the plane of the contact foil 46 because of the cuts, thus compensating for tolerances in the level of the electrical connections 21 of the electromagnets 20. The perforations 53 prevent further tearing of the cuts 52. The contact foil 46 is first connected by its soldering points 50 to the electrical connections 21 of the electromagnets 20. Then the connector base 27 is joined to the upper edge of the hydraulic block 10 at a pivoting angle of approximately 120°, so that the part of the contact foil 46 that protrudes beyond the hydraulic block 10 rests tightly against the inside of the connector base 27, with an approximately planar orientation (see FIG. 4). Now the strip conductors 47 of the contact foil 46 are connected at the soldering points 51 to the stamped screen 44 in an electrically conductive manner. The upwardly-pivoted position of the connector base 27 both permits easy soldering of the contact points 51 and guarantees that the strip conductors 47 will rest snugly against the connector base 27 during the soldering process. Subsequently the connector base 27 is joined to the hydraulic block 10 by means of upward pivoting, and the contact foil 46 unrolls onto the inside wall of the region of the connector base that covers the hollow space 35, as shown in FIGS. 2 and 3. The contact foil 46 is forced into a defined angular position in which the occurrence of chafe marks caused during the vibration of the unit is prevented. The connector base 27 resting flush on the hydraulic block 10 is secured by means of the stay bolt 32 inserted through the spacing bushing 31; subsequent fastening is effected by means of screwing in the four threaded screws 29. As already stated, the connector base 27 is sealed with respect to the hydraulic block 10 by a circumferential sealing ring 28. To ventilate the hollow space 25 and carry off condensation water that might collect there, a slit 54, 55 is cut into both sides of the spacing bushing 31, at the lowest point of the connector base 27. Direct injection of water is prevented by the 90° positioning of the slits 54, 55.

The contact foil 46 has two recesses 56, 57 disposed centrally, one behind the other in the longitudinal direction (FIG. 4). As can be seen from FIG. 2, these recesses 56, 57 serve to guide the pigtail 49 through to the electric motor 18, and the one end of an intermediate connector 58 provided for the electrical motor connection. As can be seen in FIGS. 2 and 4, the intermediate connector 58 made of plastic has a tube 59 that is inserted through a bore 60 in the hydraulic block 10, as far as its side supporting the electric motor 18. A contact bushing 61 that is soldered or crimped onto the one end of the pigtail 49 inserted through the tube 59 is secured at the end of the tube 59 protruding from this side. The other end of the pigtail 49 is soldered onto the terminal tag 48 of the stamped screen 44 and, in the course of pivoting the connector base 27 on the hydraulic block 10, passes through the recess 56 in the contact foil 46. On its outer circumference, the tube 59 supports a pine-tree profile that clamps the intermediate connector 58 in the hydraulic block 10 after the tube 59 has been inserted through the bore 60. A connector part 62 is pushed onto the contact bushing 61, through which the electrical connection to the electric motor 18 is produced.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electrohydraulic unit for controlling a fluid pressure in vehicle braking systems, having a hydraulic block that includes fluid magnet valves with electromagnets which protrude from one side of the hydraulic block, fluid pumps, fluid chambers and corresponding fluid conduits, an electric motor mounted on the hydraulic block for driving the fluid pumps and secured on an opposite side of the hydraulic block, two electrical relays for magnet valves and the electric motor that are disposed on the side of the hydraulic block supporting the electromagnets, and having a cover that protects the electromagnets and relays, on which at least one connector group is disposed that is accessible from the outside and has a plurality of connectors for attaching an electrical connector, whose connector connections are connected to the electrical connections of the electromagnets, the relays and the electric motor, the cover (24) is subdivided into a connector base (27) that includes the connector group (26) with connectors (25) and their connector connections, and a covering hood (40) that can be attached to the connector base (27); the connector base (27) is seated flush on one side of the hydraulic block (10) and has a hollow space (35) in a region of the electromagnets (20) that receives said electromagnets; an electrical circuit between the connector connections and the electrical connections (21) of the electromagnets (20) is completed by means of a contact foil (46); the connector base (27) has two connector receptacles (36, 37) one each for each of two relays (23), disposed symmetrically to an axis of the housing and spaced from the hollow space (35) at a distance from a center of the connector base, that the two connector receptacles are embodied as electrically connected connector bushings (38) for connection pins (22) of the relays (23); and that the covering hood (40) that can be attached to the connector base (27) is embodied such that the covering hood overlaps the two relays (23) inserted into the connector receptacles (36, 37) and secures them against axial displacement.

2. The unit as defined by claim 1, in which the connector base (27) has a recess (39) on each of its lateral, outer surfaces in the region of the connector receptacle (36, 27) that is embodied such that the relays (23) inserted into the connector receptacles (36, 37) can be grasped from behind.

3. The unit as defined by claim 2, in which the covering hood (40) is sealed with respect to the connector base (27) by means of a labyrinth (43) and is secured to the connector base (27) by means of a screw (42) inserted through the center of the covering hood (40).

4. The unit as defined by claim 2, in which the connector base (27) is sealed with respect to the hydraulic block (10) by means of a circumferential sealing ring (28) that has a contour adapted to the contours of the connector base (27), and is secured to the hydraulic block (10) by means of threaded screws (29); and that a stay bolt (32) for suspending the unit in the vehicle, can be screwed into the hydraulic block (10), and passes through a spacing bushing (31) disposed in the center of the connector base (27) serves to secure the connector base (27).

5. The unit as defined by claim 2, in which the connectors (25) with their connector connections, and the connector bushings (38) with their electrical connections, and the part of the electrical connection lines that extends in the connector base (27) to the magnet valves (11) and the electric motor (18) are formed by a stamped screen (44) that is embedded in the connector base (27).

6. The unit as defined by claim 1, in which the covering hood (40) is sealed with respect to the connector base (27) by means of a labyrinth (43) and is secured to the connector base (27) by means of a screw (42) inserted through the center of the covering hood (40).

7. The unit as defined by claim 6, in which the connector base (27) is sealed with respect to the hydraulic block (10) by means of a circumferential sealing ring (28) that has a contour adapted to to the contours of the connector base (27), and is secured to the hydraulic block (10).by means of threaded screws (29); and that a stay bolt (32) for suspending the unit in the vehicle, can be screwed into the hydraulic block (10), and passes through a spacing bushing (31) disposed in the center of the connector base (27) serves to secure the connector base (27).

8. The unit as defined by claim 6, in which the connectors (25) with their connector connections, and the connector bushings (38) with their electrical connections, and the part of the electrical connection lines that extends in the connector base (27) to the magnet valves (11) and the electric motor (18) are formed by a stamped screen (44) that is embedded in the connector base (27).

9. The unit as defined by claim 1, in which the connector base (27) is sealed with respect to the hydraulic block (10) by means of a circumferential sealing ring (28) that has a contour adapted to the contours of the connector base (27), and is secured to the hydraulic block (10) by means of threaded screws (29); and that a stay bolt (32) for suspending the unit in the vehicle, can be screwed into the hydraulic block (10), and passes through a spacing bushing (31) disposed in the center of the connector base (27) serves to secure the connector base (27).

10. The unit as defined by claim 9, in which on both sides of the spacing bushing (31), slits (54, 55) for ventilating and carrying off leakage are provided for the stay bolt (32), at the lowest point of the connector base (27).

11. The unit as defined by claim 10, in which the connectors (25) with their connector connections, and the connector bushings (38) with their electrical connections, and the part of the electrical connection lines that extends in the connector base (27) to the magnet valves (11) and the electric motor (18) are formed by a stamped screen (44) that is embedded in the connector base (27).

12. The unit as defined by claim 9, in which the connectors (25) with their connector connections, and the connector bushings (38) with their electrical connections, and the part of the electrical connection lines that extends in the connector base (27) to the magnet valves (11) and the electric motor (18) are formed by a stamped screen (44) that is embedded in the connector base (27).

13. The unit as defined by claim 1, in which the connectors (25) with their connector connections, and the connector bushings (38) with their electrical connections, and the part of the electrical connection lines that extends in the connector base (27) to the magnet valves (11) and the electric motor (18) are formed by a stamped screen (44) that is embedded in the connector base (27).

14. The unit as defined by claim 13, in which the stamped screen (44) is made up of two separately produced partial screens (441, 442) injected into the connector base (27) of which the first partial screen (441) is integrated into the region of the connector base overlapping the hollow space (45), and the second partial screen (442) is integrated into the region of the connector base overlapped by the covering hood (40); and that a part of the connector (25) of the connector group (26) is embodied on both partial screens (441, 442).

15. The unit as defined by claim 14, in which the flexible contact foil (46) is soldered to the first partial screen (441) and, after the connector base (27) has been placed on the hydraulic block (10), is bent by 180° and guided in a defined manner in its curved region along a part of the hollow space bordering the connector base (27).

16. The unit as defined by claim 14, in which the ground terminal of the stamped screen (44) is formed by a ground screw (45) screwed into the hydraulic block (10), to which the stamped screen (44) is attached by means of a loop.

17. The unit as defined by claim 16, in which the flexible contact foil (46) is soldered to the first partial screen (441) and, after the connector base (27) has been placed on the hydraulic block (10), is bent by 180° and guided in a defined manner in its curved region along a part of the hollow space bordering the connector base (27).

18. The unit as defined by claim 13, in which the contact foil (46) has at least one centrally disposed, longitudinally extending slit (54), through which a pigtail (49) for the electric motor (18) is guided that is soldered at one end to a terminal tag (48) protruding from the stamped screen (44) into the hollow space (35), and at the other end to a contact bushing (61) for the connection of the electric motor.

19. The unit as defined by claim 18, in which the contact bushing (61) is held on an intermediate connector (58) made of plastic and that has a tube (59) that partly receives the pigtail (49), at the free end of which tube the contact bushing (61) is secured; and that the intermediate connector (58) is inserted with its tube (59) from the side of the hydraulic block (10) that supports the electromagnets (20) of the magnet valves (21) through a bore (60) in the hydraulic block (10).

20. The unit as defined by claim 19, in which the intermediate connector (58) is locked to the hydraulic block (10).

21. The unit as defined by claim 20, in which the locking is effected by means of a pine-tree profile embodied on the tube, with which the tube (59) is pushed into a bore (60) in the hydraulic block (10).

22. The unit as defined by claim 18, in which a connector part (62) is pushed onto the contact bushing (61) through which an electrical connection is made to the electric motor.

23. The unit as defined by claim 13, in which the contact foil (46) has at least one centrally disposed, longitudinally extending slit (54), through which a pigtail (49) for the electric motor (18) is guided that is crimped at one end to a terminal tag (48) protruding from the stamped screen (44) into the hollow space (35), and at the other end to a contact bushing (61) for the connection of the electric motor.

24. The unit as defined by claim 23, in which the contact bushing (61) is held on an intermediate connector (58) made of plastic and that has a tube (59) that partly receives the pigtail (49), at the free end of which tube the contact bushing (61) is secured; and that the intermediate connector (58) is inserted with its tube (59) from the side of the hydraulic block (10) that supports the electromagnets (20) of the magnet valves (21) through a bore (60) in the hydraulic block (10).

25. The unit as defined by claim 24, in which the intermediate connector (58) is locked to the hydraulic block (10).

26. The unit as defined by claim 1, in which the contact foil (46) has strip conductors (47) with soldering points (50) for soldering to the electromagnet connections (21); and that cuts (52) are made into the contact foil (46) around at least one part of the ends of the strip conductors that support the soldering points (50), at a distance from the strip conductors (47), and terminate respectively in a perforation (53) in the contact foil (46).

* * * * *